(No Model.)
O. A. GAGER.
OVAL OR CIRCULAR DISH MADE FROM CERAMIC MATERIAL OR GLASS.
No. 275,033. Patented Apr. 3, 1883.
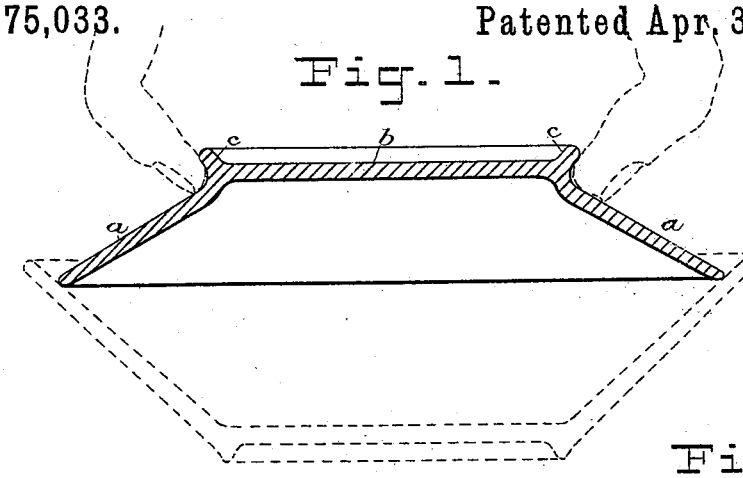
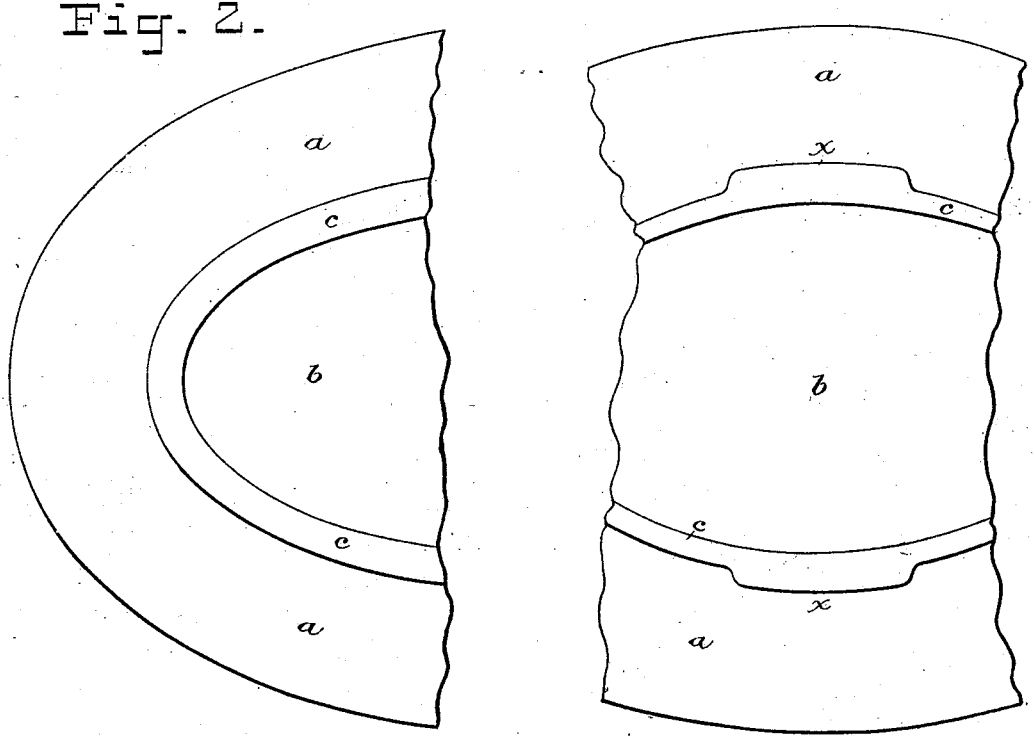
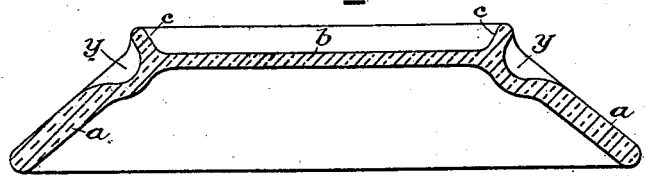
WITNESSES:
Geo. H. Fraser.
E. B. Bolton.
INVENTOR:
Oliver A. Gager
By his Attorneys,
Binky, Fraser & Connett

UNITED STATES PATENT OFFICE.

OLIVER A. GAGER, OF BROOKLYN, NEW YORK.

OVAL OR CIRCULAR DISH MADE FROM CERAMIC MATERIAL OR GLASS.

SPECIFICATION forming part of Letters Patent No. 275,033, dated April 3, 1883.

Application filed February 21, 1883. (No model.)

*To all whom it may concern:*

Be it known that I, OLIVER A. GAGER, a citizen of the United States, residing at Brooklyn, Kings county, New York, have invented certain Improvements in Oval and Circular Dishes made from Ceramic Material or Glass, of which the following is a specification.

It is well known that one of the important functions of a dish is to serve as a cover for a similar dish of the same form, whereby the contents of the latter are kept hot when served. The dish which serves as a cover is usually a little smaller than the one containing the hot food, and, as ordinarily constructed, the covering-dish is somewhat difficult to remove, the foot or base, which is uppermost, being a mere raised rib or rim, usually beveled from base to top. The attempt to grasp the dish by this foot in order to lift it off will usually result in a failure, and sometimes in the destruction of one or both dishes by reason of the insecurity of the grip on the inverted dish. To obviate this defect without in the least impairing the efficiency of the dish for any purpose to which it is ordinarily applied is the purpose of my present invention.

In carrying out my invention I provide the dish with a flared or undercut foot. This form may extend to the entire foot, which is usually of an annular form, corresponding to the shape of the dish, or only portions of the foot on opposite sides may be thus formed. This enables one to get a firm grip on the foot, as the thumb and fingers take under the overhanging lip in whole or in part, and enable the dish to be lifted with ease.

In the drawings which serve to illustrate my invention, Figure 1 is a cross-section of an inverted dish provided with my improved foot in its preferred form. Fig. 2 is a plan or bottom view of about one-half of the same. Fig. 3 is a plan or bottom view of a dish provided with a modified form of my improved foot— that is to say, only portions of the foot overhang or are undercut. Fig. 4 illustrates in section another modification, which will be hereinafter described.

In Figs. 1, 2, and 3 I have illustrated my invention as applied to an oval or elliptical dish; but it may also be applied to circular or irregularly-shaped dishes as well. Fig. 4 may illustrate a small circular dish.

Let $a$ represent the rim or sloping side of a dish; $b$, its bottom, and $c$ the foot. In Figs. 1 and 2 this foot is constructed to incline outwardly all around, so as to overhang when the dish is inverted a part of the side $a$. This leaves a channel or space exterior to the foot all around for the thumb and fingers to take into, as indicated by the dotted lines in Fig. 1. In Fig. 3 only the portions of the foot $x\ x$ are constructed as in Fig. 1, the remaining portion being made, if desired, in the usual way— that is to say, as shown in the dish illustrated by the dotted lines in Fig. 1. In Fig. 4 the dish is shown as provided with the ordinary foot, except at two points arranged oppositely, where undercut recesses $y\ y$ are formed to receive the fingers. In all of these constructions the foot, when the dish is not inverted, performs its usual functions as a support for the dish, and my improvements do not in any way interfere with these.

Having thus described my invention, I claim—

A dish provided with a foot having a recess arranged exteriorly to the same and overhung by said foot when the dish is inverted, whereby the fingers are enabled to take under said foot in grasping the inverted dish for the purpose of lifting it, substantially as set forth.

In witness whereof I have hereunto signed my name in the presence of two subscribing witnesses.

OLIVER A. GAGER.

Witnesses:
HENRY CONNETT,
ARTHUR C. FRASER.